Patented Nov. 3, 1942

2,300,930

UNITED STATES PATENT OFFICE 2,300,930

MINERAL WOOL

Raymond C. Johnson, Pittsburgh, Pa., assignor to Anthracite Industries, Inc., a corporation of Delaware No Drawing. Application August 8, 1938, Serial No. 223,687

1 Claim. (Cl. 106—50)

This invention relates to mineral wool and its production. I have discovered that by specific procedure a new source for mineral wool may be opened, a source that otherwise is regarded as waste material, and a source that may be drawn upon with new economies, and I have found the product to be distinguished in composition, and superior in composition to the common run of mineral wools, and on such account of superior utility.

Mineral wool is a substance composed of very fine, interlaced mineral fibers having the appearance of loose wool or cotton. It is a fibrous glass-like material, composed principally of silicates of calcium and aluminum together with other minor constituents. The materials commonly employed for the production of mineral wool are the natural "wool rock" of Indiana (calcareous shale or argillaceous limestone); common shale; clay; combinations of calcareous and siliceous materials, including slags from metallurgical furnaces. Among these materials there are some that require the addition of flux, and the fluxes commonly used include limestone, dolomite, fluorspar, feldspar, and scrap metal.

The usual method of manufacture consists in charging the raw materials, in the form of large lumps and free of dust or fines, and mixed with coke as fuel, into a vertical cupola, which usually is water jacketed. As the coke burns the materials coalesce in a molten mass that flows in continuous stream from the bottom of the cupola. This emerging stream is blasted with high-pressure steam or air. Under the blast the molten material is instantly torn into drops which, projected forcibly through the air, produce long, fine strands. The cooled product is a mass of soft, interlacing, wool-like fibres, in which is dispersed a varying amount of glass shot. The color varies from white to brown or gray, depending upon the composition of the cupola charge and the conditions of manufacture.

The molten material may be extenuated to fibre by other methods than blowing, as by spinning, by extrusion through minute orifices, and by centrifugal action.

I have discovered that the ash of certain solid fuels is of such composition that, when the fuel is burned at a high rate in certain types of industrial furnaces, the ash modified by the addition of desired material (carrying a fluxing agent such as limestone or dolomite) either before or after the fuel is burned, melts into a free-flowing molten glass that can be blown or spun by known methods into mineral wool of good quality. In this way it is possible to adjust the composition and physical properties of the molten glass so that mineral wool of the desired specifications may be produced.

This process offers greater economy in the manufacture of mineral wool than any known process. For example, there are steam plants regularly producing large tonnages of molten fuel ash suitable for the manufacture of mineral wool. The ash needs only a small adjustment in composition, by adding a fluxing agent before or after the fuel is burned, to meet specifications. This mineral wool will usually be of the high-alumina type and should offer advantages over the conventional mineral wool.

The economies of this process are strikingly great. In the first place, there is no cost for the molten coal ash, since it is already being produced as a waste product. At present its disposal is a problem and an added expense. Since the material is already molten, there is no fuel cost chargeable to the process and no cost for operating a melting furnace. Thus, the costs of raw material, fuel, and cupola are eliminated. Furthermore, the cost of steam for blowing the wool and other power requirements will be at a minimum at a large steam plant. The cost of the added flux will not be large, and resulting improvements in steam-plant operation may help to absorb even this small material cost.

Obviously there is no freight cost on raw materials (other than flux) or fuel chargeable to the process. Furthermore, since large steam plants are usually located in or near centres of population, the cost of transportation of the bulky finished product will be at a minimum.

It is well known that certain types of metallurgical slags are used as ingredients in the manufacture of commercial mineral wool. However, to the best of my knowledge, such metallurgical slags always require the addition of other ingredients or alteration, in order to produce satisfactory wool. For example, iron-blast-furnace slag commonly contains a large excess of lime, and on that account is wholly unsuited to the production of mineral wool, without the addition of a large proportion of other material. Furthermore, such slag contains a considerable amount of sulphur compounds (since one of the main functions of the slag is to remove sulphur from the blast-furnace). This sulphur is very objectionable in mineral wool for several reasons.

It is my discovery that, by using a mixture of fuels, or a small addition to the raw fuel, the composition can easily be modified to give the desired analysis. The sulphur content of the molten ash is commonly very low, even though high sulphur coals have been burned. This is in striking contrast to metallurgical operations with a limy slag, in which the highly objectionable sulphur is concentrated in the slag.

Fuel ash analyses vary considerably, depending upon the source of the fuel. It is customary, when reporting chemical analyses of minerals, to calculate and report each element found, to the basis of its oxide, and this practice will be followed in the ensuing discussion. Little is known about the actual chemical combinations present in fuel ash that has been produced under various conditions.

Coal and coke ashes consist principally of silica and alumina, with varying and sometimes large amounts of iron oxides and lime, and smaller amounts of minor constituents such as magnesia, titania, sulphur and phosphorus oxides, etc.

To simplify this discussion, fuel ashes will be divided into three classes:

1. Fuel ash of such composition that it is suitable for the manufacture of mineral wool without the addition of other materials. This will ordinarily consist of ash containing rather large individual or combined percentages of lime, iron oxides, magnesia, or alkalies. Following are the analyses of ash which can be used for the production of mineral wool without the addition of other materials:

|  | Ash A | Ash B | Ash C |
| --- | --- | --- | --- |
|  | Percent | Percent | Percent |
| Silica ($SiO_2$) | 39 | 46 | 39 |
| Alumina ($Al_2O_3$) | 15 | 15 | 18 |
| Lime (CaO) | 8 | 18 | 18 |
| Total iron as $Fe_2O_3$ | [1] 38 | 17 | 6 |
| Magnesia (MgO) | 1 | 1 | 7 |
| Alkalies ($Na_2O+K_2O$) | 4 | 3 | 8 |

[1] Including iron present as FeO and Fe.

Analyses A and B represent the ash from certain bituminous coals having a low ash-softening temperature, while analysis C represents the ash from a refuse incinerator. The ash from the refuse that commonly comes to a municipal incinerator is derived, specifically, from wood and miscellaneous vegetable and animal wastes, and contains, together with suitable percentages of silica and alumina, considerable quantities of such fluxing constituents as alkalis and lime. I have found it to be a valuable source of mineral wool.

2. At the other extreme is fuel ash consisting chiefly of silica and alumina, and which is therefore high melting or refractory, and will not form a free-flowing fluid ash at normal furnace temperatures. However, I have discovered that such ash can be readily used for the production of high-grade mineral wool, by simply adding an appropriate amount of limestone, dolomite, or other suitable flux, thus producing a free-flowing glass which is very suitable for the production of mineral wool. Following is an example of such an ash:

|  | Ash D |
| --- | --- |
| Silica ($SiO_2$) | 52.9 |
| Alumina ($Al_2O_3$) | 35.1 |
| Lime (CaO) | 1.0 |
| Total iron as $Fe_2O_3$ | 4.0 |
| Magnesia (MgO) | 0.1 |
| Alkalies ($Na_2O+K_2O$) | 4.1 |

Analysis D represents anthracite ash, which has a high ash-softening temperature, and is not suitable for the manufacture of mineral wool without the addition of a flux. However, I have prepared light-colored mineral wool of excellent quality from ash of this composition, by melting a mixture of 70% of the above ash with 30% lime (CaO). In commercial processes, an amount of limestone ($CaCO_3$) equivalent to 30% lime may be used, owing to its lower cost. Dolomite, which is a calcium-magnesium carbonate may also be used to good advantage. With this particular ash, calcium-oxide additions amounting to 25% to 35% of the product gave a molten product of high fluidity. However, I do not wish to be limited to this narrow range of flux addition, since useful compositions are not limited to this range, and the optimum amount of flux will naturally depend upon the analysis of the ash and the character of the flux.

3. Between the above two types of fuel ashes occurs a very large intermediate group of ashes that contain considerable amounts of lime, magnesia, iron oxides, or alkalies, but that need some additional flux, depending upon their composition. Mineral wools that are derived from the sources now commonly drawn upon have a moderate alumina content, averaging perhaps 12%, while wools of this invention, made from fuel ash, are in a different class, owing to the fact that their alumina content is higher, ranging from 15% upward to 24% and more. This high alumina content I consider an advantage, as high-alumina-content mineral wool is a better insulator under moist or humid conditions, because it has less tendency to collect moisture from the air. High-alumina glasses tend to resist heat, devitrification, and chemical attack better than conventional glasses.

Reference to phase-equilibrium diagrams of the refractory oxides shows that most commercial mineral wools, derived from sources heretofore drawn upon, necessarily of such composition that the eutectic condition occurs at low temperature, having an alumina content of approximately 12%.

The material of my invention, however, reveals its eutectic condition at an even lower temperature, and has alumina content that ranges from 15% upward. These percentages refer to the eutectics of the three-component system consisting of pure silica, alumina, and lime. Since all mineral wools contain other constituents, their eutectics are, of course, somewhat different from that of the pure materials. I attribute the practicability of my invention largely to taking advantage of this high-alumina eutectic composition, which is readily obtainable by starting with fuel ash as a raw material.

From fuel ash I have produced wool of various colors, ranging from almost pure white to brown and dark gray, depending upon the composition of the ash, processing methods, and fibre size. Light-colored wool is readily produced from fuel ash which is low in iron (e. g. high-fusing ash from Pennsylvania anthracite).

I have also discovered that, in the case of fuel ashes containing considerable iron, much of this iron can readily be removed in the form of siliceous pig iron, by heating the molten ash under reducing conditions, e. g. in the presence of carbon. Under these conditions, much of the iron is reduced to metallic iron which collects as molten iron in a layer beneath the melted ash. The resulting wool will in such case be much lighter in color, due to the low iron content. The siliceous iron or ferrosilicon so produced may be of low sulphur content. When working with ashes of such higher iron content, the iron so recovered will be found to be a valuable product.

My idea is to remove iron as a controlled step in the process, since it may often be desirable to leave a definite amount of combined iron in the melt, as well as to produce metallic iron of desired analysis.

I heat molten coal ash (including a flux) under reducing conditions such that a controlled removal of iron is obtained, in order to produce the desired composition of melt for the production of specification mineral wool.

I claim as my invention:

The method herein described of producing from iron-containing and carbon-containing coal ashes mineral wool substantially free of iron which consists in bringing the coal ashes commingled with a fluxing agent to combustion, and thereby burning the carbon content of the mass, and melting the incombustible component with reduction to metallic state and gravitational separation of the iron, and blowing to wool the molten incombustible component so relieved of iron.

RAYMOND C. JOHNSON.